INVENTOR
D. G. STERRY

Sept. 12, 1967 D. G. STERRY 3,341,809
SEISMIC SIGNAL INTERPRETATION BY USE OF CROSS-CORRELATION
AND PATTERN RECOGNITION MATRICES
Filed Aug. 9, 1965 3 Sheets-Sheet 3

*INVENTOR*
D. G. STERRY

BY *Young & Quigg*

*ATTORNEYS*

United States Patent Office 3,341,809
Patented Sept. 12, 1967

3,341,809
SEISMIC SIGNAL INTERPRETATION BY USE OF CROSS-CORRELATION AND PATTERN RECOGNITION MATRICES
Dan G. Sterry, Bartlesville, Okla., assignor to Phillips Petroleum Company, a corporation of Delaware
Filed Aug. 9, 1965, Ser. No. 478,184
4 Claims. (Cl. 340—15.5)

ABSTRACT OF THE DISCLOSURE

Vibrations are imparted to the earth and recorded at a plurality of spaced receiving stations. The vibrations received at each adjacent pair of stations are multiplied by one another and the products are integrated. These multiplication and integration steps are repeated a plurality of times with different time relationships between the recorded signals. A matrix is formed from the integrated products for use in comparison with matrices prepared in like manner from recorded vibration signals received at earth locations having known subterranean reflecting beds.

---

This invention relates to the interpretation of seismic signals in order to recognize common vibration patterns in a plurality of records.

It is common practice in the oil exploration industry to obtain information regarding subterranean formations by means of seismic exploration procedures. Vibrations are imparted to the earth by detonating an explosive charge or by other vibration imparting procedures. The resulting vibrations travel downwardly and are reflected back to the earth from subterranean reflecting beds. The reflected vibrations are received by a plurality of seismometers which are spaced from the vibration imparting point. In this manner it is possible to obtain information regarding the slopes of subterranean reflecting beds by comparing signals received at a plurality of seismometer stations. However, the recognition of common reflection patterns in the seismic records is often difficult because of the presence of extraneous noise. In many localities the records which are obtained are so poor that an observer can not distinguish common patterns in a plurality of records.

This invention provides an improved method of manipulating seismic records in order to recognize common reflection patterns. The signals received by a plurality of seismometers are first transformed into a matrix by a correlation procedure. This is accomplished by multiplying the individual records by one another and integrating the products. The multiplication and integration procedure is repeated a number of times with different arbitrary time displacements between the individual records. The resulting integrals obtained in this manner are then employed to form the correlation matrix. A plurality of reference matrices are formed in the same general manner by employing seismic signals obtained in regions having known subterranean structure. The matrices obtained by this latter procedure are then compared with the matrices obtained from the initial seismic records in order to determine the degree of correlation therebetween. In this manner, it is possible to identify the dips of reflecting beds by noting the correlation between the unknown matrices and the reference matrices obtained from known structures.

Accordingly, it is an object of this invention to provide an improved method of manipulating seismic records so as to recognize common reflecting patterns.

Another object is to provide an improved seismic exploration procedure for measuring dips of subterranean reflecting beds.

A further object is to provide apparatus for use in interpreting seismic records.

Other objects, advantages and features of the invention should become apparent from the following detailed description taken in conjunction with the accompanying drawing in which.

Figure 1:
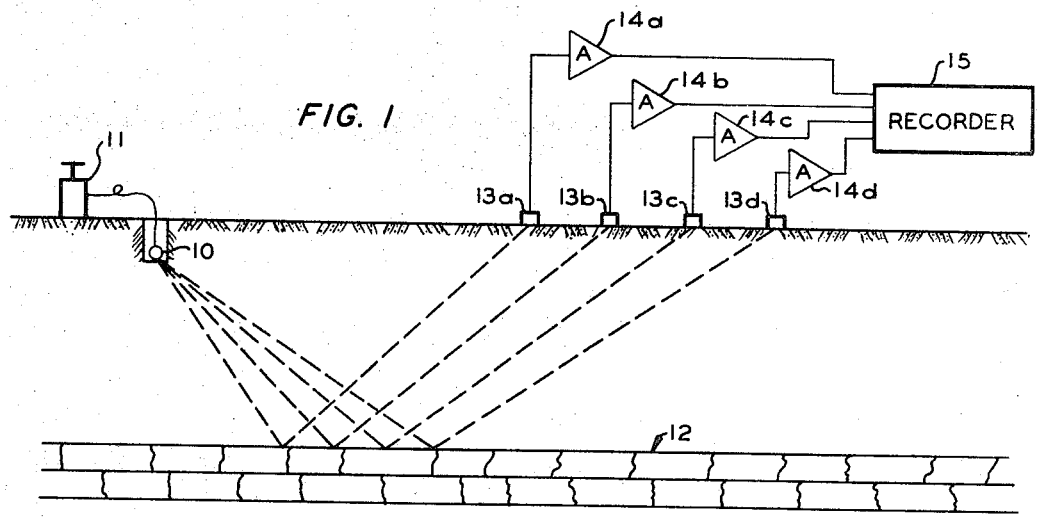
FIGURE 1 is a schematic representation of apparatus employed to obtain seismic records which are manipulated in accordance with this invention.

Referring now to the drawing in detail and to FIGURE 1 in particular, there is shown an explosive charge 10 positioned in a shot hole. Charge 10 is adapted to be exploded by means of a detonator 11. This establishes vibrations which travel downwardly through the earth to a subterranean reflecting bed 12. Vibrations which impinge on bed 12 are reflected back to the surface of the earth and are received by a plurality of seismometers 13a, 13b, 13c and 13d. These seismometers establish output electrical signals which vary in amplitude in accordance with the magnitude of the vibrations received. The output signals of seismometers 13a, to 13d are amplified by respective amplifiers 14a to 14d and applied to a recorder 15. In actual practice, a large number of seismometers is usually employed. Also, each seismometer station can represent a plurality of individual seismometers with their outputs connected together.

Figure 2:
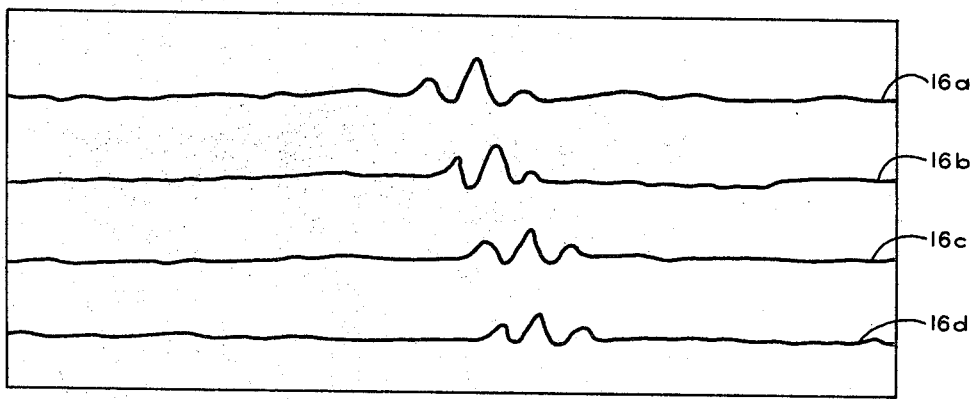
FIGURE 2 illustrates typical seismic records obtained by the apparatus of FIGURE 1.

From an inspection of FIGURE 1 it can readily be seen that the vibrations received at seismometer 13d arrive at a later time than do the vibrations received by seismometer 13a. FIGURE 2 illustrates schematically the signals 16a to 16d which are recorded from respective seismometers 13a to 13d. The abscissa represents time, while the ordinates represent amplitudes of vibrations. It can be seen that the common reflections from bed 12 appear at progressively later times in the individual records. From an inspection of a plurality of curves of the type shown in FIGURE 2, a trained geologist can often obtain valuable information regarding the dip of reflecting bed 12. However, in actual practice the reflections tend to be obscured due to the presence of random noise vibrations which are also received by the seismometers.

Figure 4:
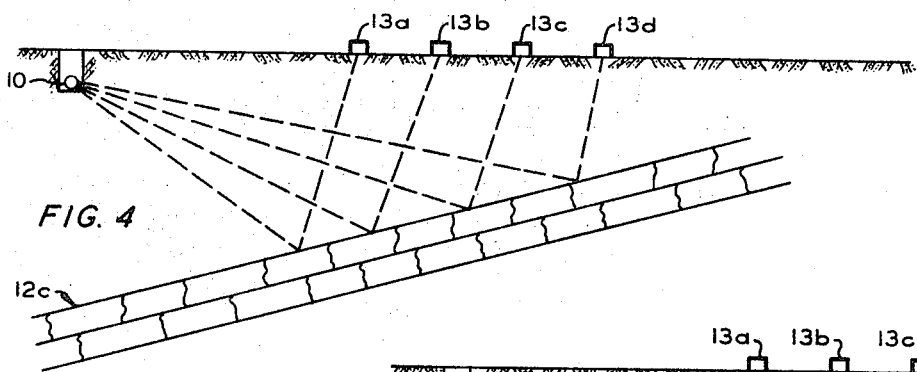
FIGURES 3 and 4 illustrate seismic exploration systems employed with reflecting beds having different dips.
Figure 3:
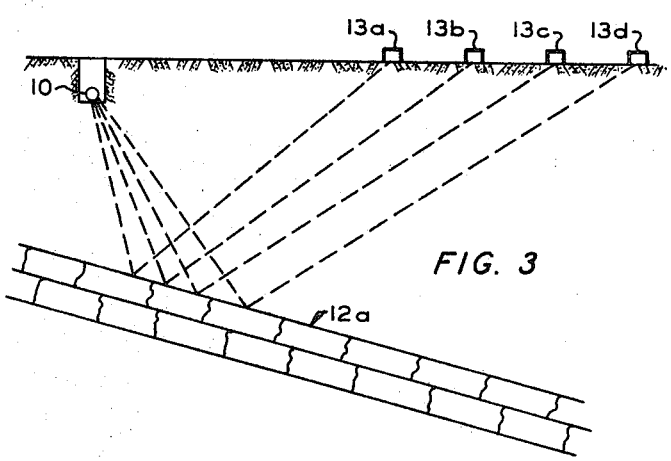

The relative times of arrival of vibrations reflected from subterranean beds are influenced by the dip of the reflecting beds. FIGURES 3 and 4, for example, illustrate schematically the paths of reflections from dipping beds. In FIGURE 3 reflecting bed 12a dips away from the shot point, whereas bed 12c in FIGURE 4 dips upwardly toward the seismometers. From an inspection of the geometry of FIGURES 3 and 4 it can readily be seen that the relative times of arrival of reflections at the spaced seismometers differ from those obtained in the system of FIGURE 1. The relative times of these arrivals thus provide the geologist with information concerning the dip of the reflecting beds. This invention is directed toward providing an improved method of determining the relative dips of the reflecting beds from recorded seismic signals.

Figure 5:
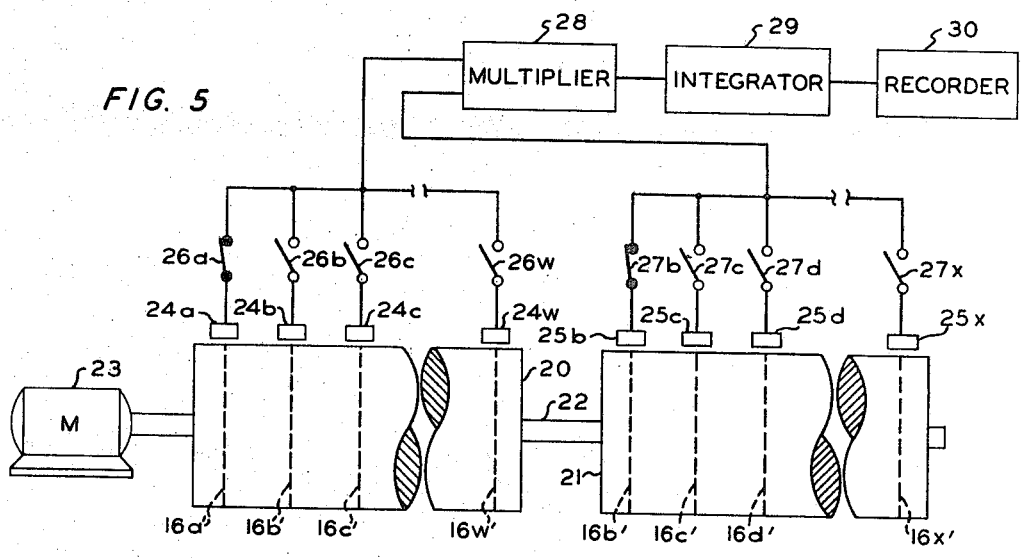
FIGURE 5 illustrates a first embodiment of apparatus which can be employed to correlate seismic traces and form the signal recognition matrices of this invention.

The first step in the method of this invention is to provide a matrix from each of the groups of seismic records. For purposes of description, it will be assumed that there are 24 seismometers spaced from one another in a seismic signal recording system of the type shown in FIGURES 1, 3 and 4. Recorder 15 thus receives 24 individual signals when explosive charge 10 is detonated. In a first embodiment of this invention, recorder 15 can advantageously be a magnetic tape recorder having at least 24 individual channels. Suitable apparatus for forming a matrix from these records is illustrated schematically in FIGURE 5. The first twenty-three of the twenty-four records are placed on a magnetic drum 20 which is mounted on a rotatable shaft 22. The second through twenty-fourth traces are placed on a second drum 21 which is also mounted on shaft 22, the latter being rotated by a motor 23. Drum 20 is provided with a plurality of recording and reproducing heads 24a to 24w, and drum 21 is provided with similar heads 25b to 25x. Heads 24a to 24w are connected through respective switches 26a to 26w to the first input of a multiplier 28. Heads 25b to 25x are connected through respective switches 27b to 27x to the second input of multiplier 28. The output of multiplier 28 is applied through an integrator 29 to a recorder 30.

Figure 8:
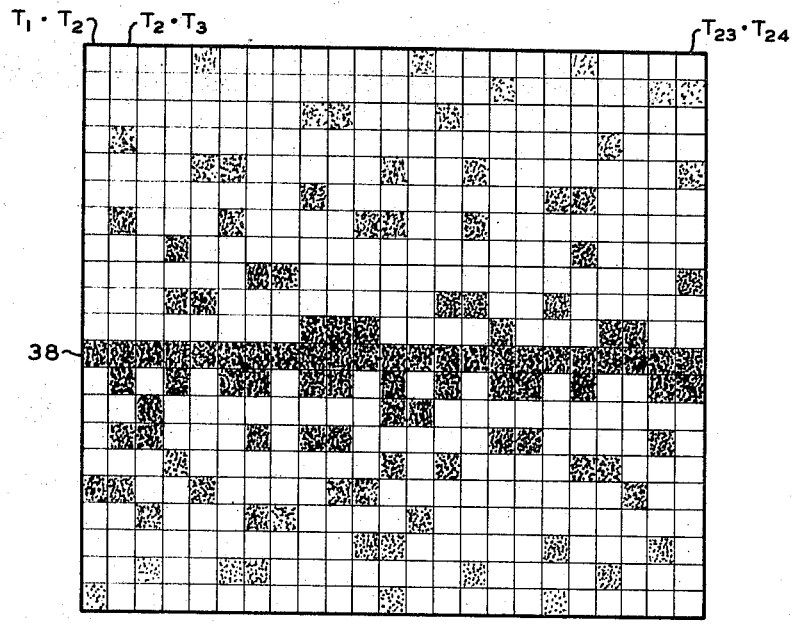
FIGURE 8 is a schematic representation of one of the matrices formed by the apparatus of this invention.

The first step in forming the matrix is to multiply adjacent pairs of signals by one another and integrate the resulting products. Signal 16a' on drum 20 and signal 16b' on drum 21 represent the signals received by the respective first two seismometers closest to the shot hole in FIGURE 1, for example. Switches 26a and 27b are closed and the remainder of the switches remain open. Thus, rotation of drums 20 and 21 results in signals 16a' and 16b' being reproduced and applied to the respective inputs of multiplier 28. The signal applied to recorder 30 at this time thus represents the integral of the product and the first two signals. Reproducing heads 24a and 25b are positioned with respect to the associated drums so that the two signals are reproduced without any adjustment in time, that is, the signals are multiplied as received in time by the respective seismometers. This process is then repeated with each adjacent pair of signals so as to provide twenty-three separate integrated products. These products are all recorded separately by recorder 30. The final products are recorded on a matrix which can have the configuration illustrated in FIGURE 8. Each vertical column in FIGURE 8 represents the product of two pairs of traces. For example, the left-hand column represents the products obtained by multiplying traces $T_1$ and $T_2$, which represent respective records 16a' and 16b' in FIGURE 5. The next vertical column represents the products obtained by multiplying traces $T_2$ and $T_3$, which traces are represented by respective records 16b' and 16c' in FIGURE 5. It can be seen that there are twenty-three vertical columns in FIGURE 8, each representing the product of an adjacent pair of traces. The integrals of the products obtained by multiplying adjacent pairs of traces with all the reproducing heads in alignment are recorded in individual boxes of the center horizontal row in FIGURE 8. With the recording heads in such alignment, the signals are reproduced in the same time sequence as recorded initially.

The foregoing process is then repeated after the reproducing heads on drum 21 are displaced relative to the heads on drum 20. For example, each of the heads on drum 21 is displaced from its corresponding head on drum 20 by an amount representative of three milliseconds. The multiplication and integration process is repeated for each pair of records, and the integrals are recorded in the horizontal line of FIGURE 8 immediately above the center line. This process is then continued a number of times with the heads on drum 21 being displaced from the heads on drum 20 by progressively larger amounts, six milliseconds, nine milliseconds, etc., for example. In this manner, a number of integrated products are obtained which are recorded in the individual squares in the upper half of the matrix of FIGURE 8. The horizontal rows farthest from the center have the greater displacements. The process is then repeated a number of times by progressively shifting the reproducing heads of drum 21 in the opposite direction to obtain "negative" displacements. The values obtained in this manner are recorded in the lower half of the matrix of FIGURE 8.

There are several procedures which can be employed to produce the matrix of FIGURE 8. In one embodiment, the matrix can be formed by a photographic film. A mask is placed over the film so that only one of the squares is exposed at any given time. The signal applied to recorder 30 in FIGURE 5 can be utilized to control the amount of light which illuminates the exposed square so that the opacity of the developed film is a function of the magnitude of the recorded signal. In other embodiments, the matrix can be formed as a punched card or as a magnetic tape to provide a record which can be applied on an input to a digital computer. The card or tape can be coded so that the magnitude of the signal stored at each square is representative of the corresponding integrated product.

The procedure thus far described results in the formation of a matrix which represents the correlation between adjacent pairs of signals obtained at each seismic location. This procedure is normally repeated a number of times in mapping a given area so as to provide a relatively large number of matrices, one for each seismometer grouping. The foregoing procedure is then repeated in areas wherein the subterranean structure is of known configuration. Such areas can be found, for example, where a number of wells have been drilled and core samples obtained. Seismic recordings are taken in a number of such known areas which have reflecting beds of different dips. The procedure described above is repeated with these "known" signals so that a plurality of reference matrices are formed wherein the seismic records represent reflections from beds having known dips. If it is not possible to obtain areas which have beds of known dips, synthetic seismic records can be produced by recording generated signals a plurality of times with different delays that are calculated from a consideration of the geometry of arbitrary dipping beds. The final step of this invention is to compare the known matrices with the unknown matrices to determine the correlation therebetween. A maximum correlation is indicative of correspondence between the dips of the known and unknown matrices. While this correlation can be accomplished visually, in many instances it is more desirable to employ pattern recognition techniques which are known in the art. Such procedures are described, for example, in Aerospace Engineering, vol. 21, No. 9, September 1962, pp. 78–123 and Stanford Electronics Laboratories, Stanford University, Technical Report No. 1554–1, ASD–TDR–62–767, SEL–62–090, July 1962. If the matrices are formed as inputs to a digital computer, the computer can be programmed to measure the correlation between the known matrices and the unknown matrices. In general, the integrals recorded in the matrix of FIGURE 8 represents a maximum at the center of the matrix when a flat reflecting bed is encountered. Sloping beds exhibit maximums above or below the center, depending on the direction of slope.

Figure 6:
FIGURE 6 illustrates schematically a photographic recording which can be employed in the correlation method of this invention.
Figure 7:
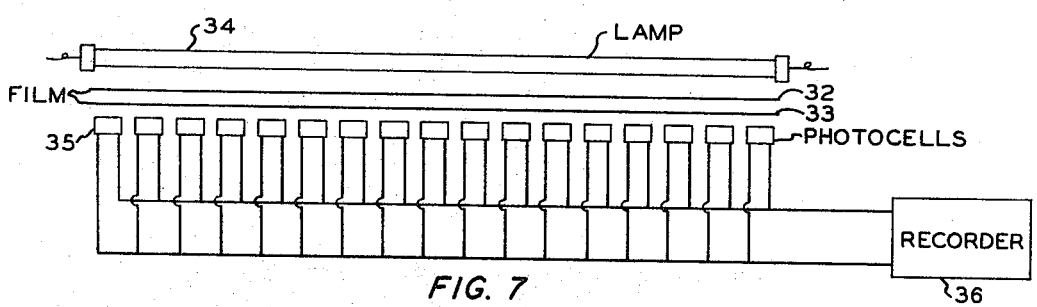
FIGURE 7 is a schematic illustration of a second embodiment of apparatus which can be employed to form the pattern recognition matrices of this invention.

Another procedure for producing the integrals which are used to form the matrix is illustrated in FIGURES 6 and 7. The initial seismic signals which are measured in the system of FIGURE 1 are recorded photographically on a film 32, as shown in FIGURE 6. The opacity of film 32 varies in accordance with the amplitude of the detected vibrations. The two signals to be multiplied and integrated are established on films which are positioned adjacent one another, such as films 32 and 33 of FIGURE 7. A lamp 34 is positioned to direct radiation through the two films to impinge on a plurality of photocells 35. These photocells are connected in parallel with one another so that the signal applied to recorder 36 represents the integral of the product of the light transmission properties of films 32 and 33. This signal can be employed to provide one of the points in the matrix of FIGURE 8.

While this invention has been described in conjunction with presently preferred embodiments, it obviously is not limited thereto.

What is claimed is:

1. The method of seismic surveying which comprises:
    (1) imparting vibrations to the earth at a first point and recording the resulting vibrations which are received at a plurality of second points that are spaced from one another and from said first point,
    (2) multiplying by one another the recorded vibrations that are received at adjacent second points and integrating the resulting products to provide a plurality of integrated products,
    (3) repeating step 2 a plurality of times with progressively different time relationships between the recorded vibrations that are being multiplied,
    (4) forming a matrix by recording the integrated products of steps 2 and 3 in such a manner that the integrated products of step 2 form a first row on the recording medium and the plurality of integrated products of step 3 form respective adjacent rows on the recording medium.
    (5) repeating steps 1 to 4 a plurality of times wherein steps 1 are carried out at different locations on the earth wherein the slopes of subterranean reflecting beds are different and known so as to form a plurality of reference matrices, and
    (6) comparing the first formed matrix with the reference matrices to determine the slopes of the unknown subterranean reflecting beds.

2. The method of claim 1 wherein said matrix is formed by exposing sectors of a photographic plate by amounts representative of respective integrated products.

3. The method of seismic surveying which comprises:
    (1) imparting vibrations to the earth at a first point and recording the resulting vibrations which are received at a plurality of second points that are spaced from one another and from said first point,
    (2) multiplying by one another the recorded vibrations that are received at adjacent second points and integrating the resulting products to provide a plurality of integrated products,
    (3) repeating step 2 a plurality of times with progressively different time relationships between the recorded vibrations that are being multiplied,
    (4) forming a matrix by recording the integrated products of steps 2 and 3 in such a manner that the products obtained with zero time displacements between the recorded vibrations form a first central row extending across the matrices in a first direction and the products obtained with other time displacements between the recorded vibrations form additional rows extending across the matrix in said first direction, the rows representing integrated products obtained with progressively greater time displacements being located progressively greater distances from said first row, the rows representing integrated products obtained with relative time displacements in one direction being on one side of said first row and the rows representing integrated products obtained with relative time displacements in the other direction being on the opposite side of said first row, the integrated products of vibrations received at common pairs of adjacent second points forming common rows in a second direction which is at right angles to said first direction, and
    (5) repeating steps 1 to 4 a plurality of times at regions of the earth different from the region employed in steps 1 to 4, thereby forming a plurality of matrices.

4. The method of claim 3, further comprising repeating the steps of claim 3 a plurality of times wherein the vibrations are imparted to the earth at a plurality of different locations wherein the slopes of subterranean reflecting beds are different and known so as to form a plurality of reference matrices and comparing the first formed matrices with the reference matrices to determine the slopes of the unknown subterranean reflecting beds.

References Cited

UNITED STATES PATENTS

| | | | |
|---|---|---|---|
| 2,839,149 | 6/1958 | Piety | 340—15.5 X |
| 3,145,341 | 8/1964 | Andrew | 340—15.5 |
| 3,196,396 | 7/1965 | Reines et al. | 340—15.5 |
| 3,204,248 | 8/1965 | Alexander | 340—15.5 |
| 3,216,523 | 11/1965 | Naquin et al. | 340—15.5 X |
| 3,227,034 | 1/1966 | Shelton | 340—146.3 X |
| 3,254,835 | 6/1966 | Glazier et al. | 181—.5 X |

BENJAMIN A. BORCHELT, *Primary Examiner.*

R. M. SKOLNIK, *Assistant Examiner.*